(12) United States Patent
Bielawski et al.

(10) Patent No.: US 8,474,898 B1
(45) Date of Patent: Jul. 2, 2013

(54) VEHICLE FLOOR MAT

(75) Inventors: Uri Bielawski, Commerce Township, MI (US); Martin Petersen, Canton, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 13/336,686

(22) Filed: Dec. 23, 2011

(51) Int. Cl.
*B62D 25/20* (2006.01)

(52) U.S. Cl.
USPC ........................................ 296/97.23

(58) Field of Classification Search
USPC ............... 296/97.23, 39.1; D12/203; D6/582, D6/583, 592
See application file for complete search history.

(56) References Cited

U.S. PATENT DOCUMENTS

| | | | | | |
|---|---|---|---|---|---|
| 1,251,865 | A | * | 1/1918 | Colvin | 180/90.6 |
| 2,993,726 | A | * | 7/1961 | Paolucci | 296/97.23 |
| 3,129,972 | A | * | 4/1964 | Vodra | 296/97.23 |
| 5,439,725 | A | * | 8/1995 | Roberts | 428/95 |
| 5,765,900 | A | * | 6/1998 | Hills | 296/97.23 |
| D404,351 | S | * | 1/1999 | Kruk | D12/203 |
| 6,017,074 | A | * | 1/2000 | Biskup | 296/39.1 |
| D423,439 | S | * | 4/2000 | Moore | D12/203 |
| D432,477 | S | * | 10/2000 | Gorodetsky | D12/203 |
| 6,129,402 | A | * | 10/2000 | Carriere | 296/39.1 |
| D434,359 | S | * | 11/2000 | Moore | D12/203 |
| 7,007,997 | B1 | * | 3/2006 | Wieczorek et al. | 296/65.03 |
| 7,648,187 | B2 | * | 1/2010 | Hoffman et al. | 296/97.23 |
| 7,727,612 | B2 | * | 6/2010 | Haraguchi et al. | 428/99 |
| 8,277,918 | B1 | * | 10/2012 | Gifford et al. | 428/43 |
| 2003/0143358 | A1 | * | 7/2003 | Needles | 428/43 |
| 2004/0080176 | A1 | * | 4/2004 | Haraguchi et al. | 296/97.3 |
| 2009/0250965 | A1 | * | 10/2009 | Duprez | 296/97.23 |
| 2012/0061990 | A1 | * | 3/2012 | Dirnfeld | 296/97.23 |

* cited by examiner

*Primary Examiner* — H Gutman
(74) *Attorney, Agent, or Firm* — Young, Basile, Hanlon & MacFarlane, P.C.

(57) ABSTRACT

A floor mat is positionable in front of a vehicle seat on a vehicle floor of a vehicle having at least one structural member that contacts the vehicle floor and is disposed rearward of a front edge of the vehicle seat. The floor mat includes a main body and an engagement structure. The main body has an upper surface, a lower surface, a first end, and a second end that is longitudinally spaced from the first end. The engagement structure is defined at a peripheral edge of the main body between the upper and lower surfaces. The engagement structure has a first edge portion that extends in a longitudinal direction and a second edge portion that laterally extends from the first edge portion. The second edge portion is positionable to engage the at least one structural member to restrain horizontal movement of the main body in the longitudinal direction.

20 Claims, 7 Drawing Sheets

US 8,474,898 B1

VEHICLE FLOOR MAT

TECHNICAL FIELD

The disclosure relates to the field of motor vehicle interiors.

BACKGROUND

Motor vehicle interiors commonly include a floor covering that provides a finished appearance and, in some cases, provides some degree of sound absorption. Common materials for floor mats in motor vehicle interiors include carpet and polymers such as rubber or other elastomers. Floor mats are commonly placed on the floor covering in a motor vehicle interior to protect the floor covering, to allow for easy cleaning, to enhance aesthetics, or for other reasons.

Floor mats have a tendency to shift with respect to the floor covering in an automobile. For this reason, some floor mats incorporate structures that intend to restrain the floor mat against movement with respect to the floor covering. As an example, one common structure involves a post that is connected to the floor covering, and is received in an aperture that extends through the floor mat.

SUMMARY

Vehicle floor mats are disclosed herein.

One aspect of the embodiments taught herein is a floor mat positionable in front of a vehicle seat on a vehicle floor of a vehicle having at least one structural member that contacts the vehicle floor and is disposed rearward of a front edge of the vehicle seat. The floor mat includes a main body and an engagement structure. The main body has an upper surface, a lower surface, a first end, and a second end that is spaced from the first end in a longitudinal direction of the vehicle. The engagement structure is defined at a peripheral edge of the main body between the upper and lower surfaces. The engagement structure has a first edge portion that extends in the longitudinal direction and a second edge portion that extends from the first edge portion in a lateral direction of the vehicle that is substantially perpendicular to the longitudinal direction. The second edge portion is positionable to engage the at least one structural member of the vehicle to restrain horizontal movement of the main body in the longitudinal direction of the vehicle.

Another aspect of the embodiments taught herein is a vehicle that includes a vehicle floor, a vehicle seat, at least one structural member, and a floor mat. The at least one structural member contacts the vehicle floor and is disposed rearward of a front edge of the vehicle seat. The floor mat is positionable on the vehicle floor in front of the vehicle seat and includes a main body and an engagement structure. The main body has an upper surface, a lower surface, a first end, and a second end that is spaced from the first end in a longitudinal direction of the vehicle. The engagement structure is defined at a peripheral edge of the main body between the upper and lower surfaces. The engagement structure has a first edge portion that extends in the longitudinal direction and a second edge portion that extends from the first edge portion in a lateral direction of the vehicle that is substantially perpendicular to the longitudinal direction. The second edge portion is positionable to engage the at least one structural member of the vehicle to restrain horizontal movement of the main body in the longitudinal direction of the vehicle.

Another aspect of the embodiments taught herein is a vehicle that includes a vehicle floor, a vehicle seat, at least one frame portion, and a floor mat. The at least one frame portion is connected to the vehicle floor and the vehicle seat to support the vehicle seat with respect to the vehicle floor. The floor mat is positionable on the vehicle floor in front of the vehicle seat and includes a main body and an engagement structure. The main body has an upper surface, a lower surface, a first end, and a second end that is spaced from the first end in a longitudinal direction of the vehicle. The engagement structure is defined at a peripheral edge of the main body between the upper and lower surfaces. The engagement structure has a first edge portion that extends in the longitudinal direction and a second edge portion that extends from the first edge portion in a lateral direction of the vehicle that is substantially perpendicular to the longitudinal direction. The second edge portion is positionable to engage the at least one structural member of the vehicle to restrain horizontal movement of the main body in the longitudinal direction of the vehicle. The first edge portion extends a majority of the distance between the first end and the second end and the second edge portion is disposed underneath the vehicle seat.

BRIEF DESCRIPTION OF THE DRAWINGS

The description herein makes reference to the accompanying drawings wherein like reference numerals refer to like parts throughout the several views, and wherein.

DETAILED DESCRIPTION

Some floor mats for vehicles include retaining structures that utilize hooks, clips, posts, apertures or other structures that are intended restrain the floor mat from moving with respect to the floor of the vehicle. Often, these retaining structures require that a retaining feature, such as a post be installed at a particular location on the vehicle floor. If the retaining feature is not properly secured with respect to the floor mat, the floor mat could shift with respect to the floor of the vehicle. The disclosure herein is directed to floor mats having geometric configurations that restrain movement of the floor mat. In some examples, movement of the floor mat is restrained by engagement of an edge portion of the floor mat with at least one structure of the vehicle.

Figure 1:
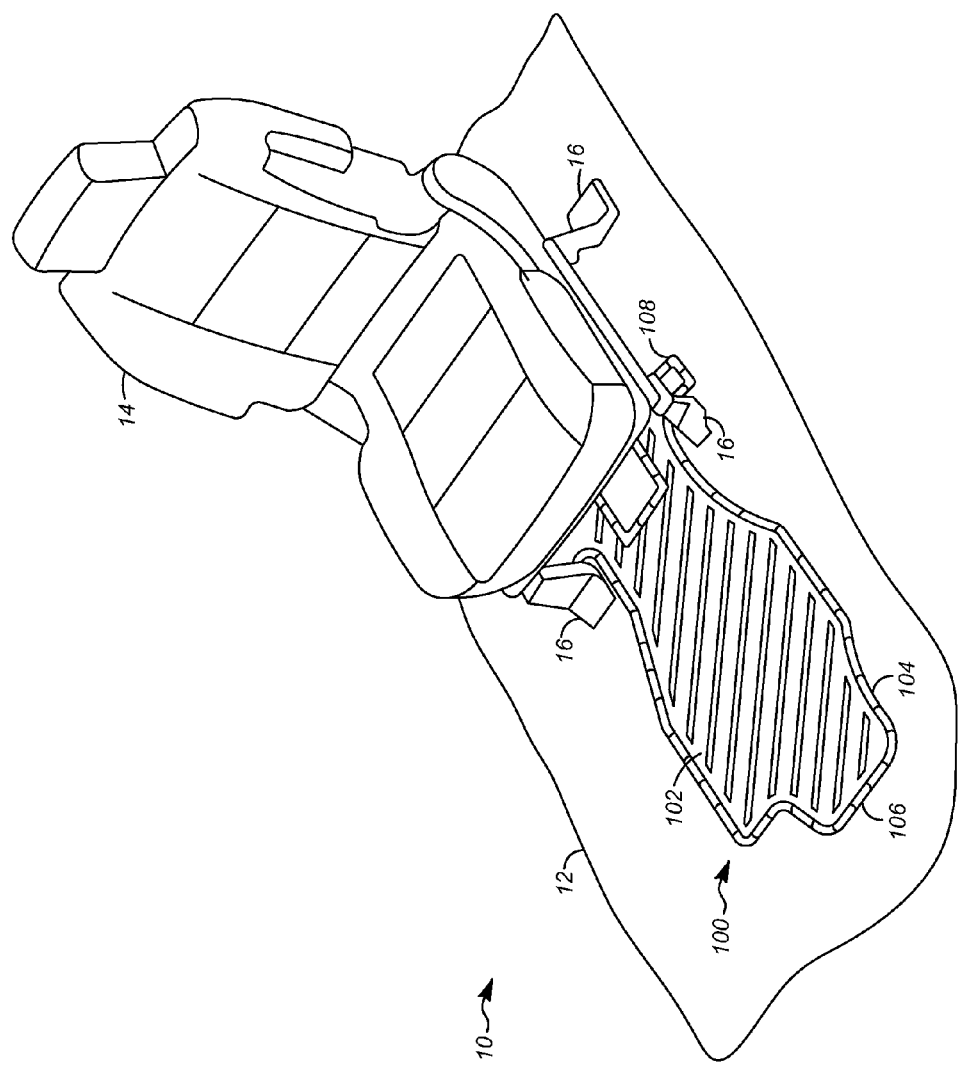
FIG. 1 is a perspective view showing a floor mat installed in a vehicle.

FIG. 1 shows a floor mat 100 that is installed within a vehicle 10. The vehicle 10 can be any type of vehicle. In some examples, the vehicle 10 is a motor vehicle, such as a car, a truck, a sport utility vehicle, a minivan, etc.

The vehicle 10 includes a floor 12 and a seat 14. At least one structure contacts the floor 12 for engagement with the floor mat 100, as will be explained herein. In the illustrated example of FIG. 1, the vehicle 10 includes a plurality of frame portions 16 that are connected to the floor 12 and the seat 14 to support the seat 14 with respect to the floor 12. In this example, the floor mat 100 is engageable with at least one of the frame portions 16.

The floor mat 100 can be in the form of a main body having an upper surface 102, a lower surface 104, a first end 106, and a second end 108. The first end 106 and the second end 108 are spaced from one another in a longitudinal direction. In this example, the longitudinal direction is a front-to-rear direction of the vehicle 10. The lower surface 104 can be in contact with the floor 12, and the upper surface 102 is located opposite the lower surface 104, such that the upper surface 102 and the lower surface 104 define opposite faces of a substantially planar configuration for the floor mat 100.

Figure 2:
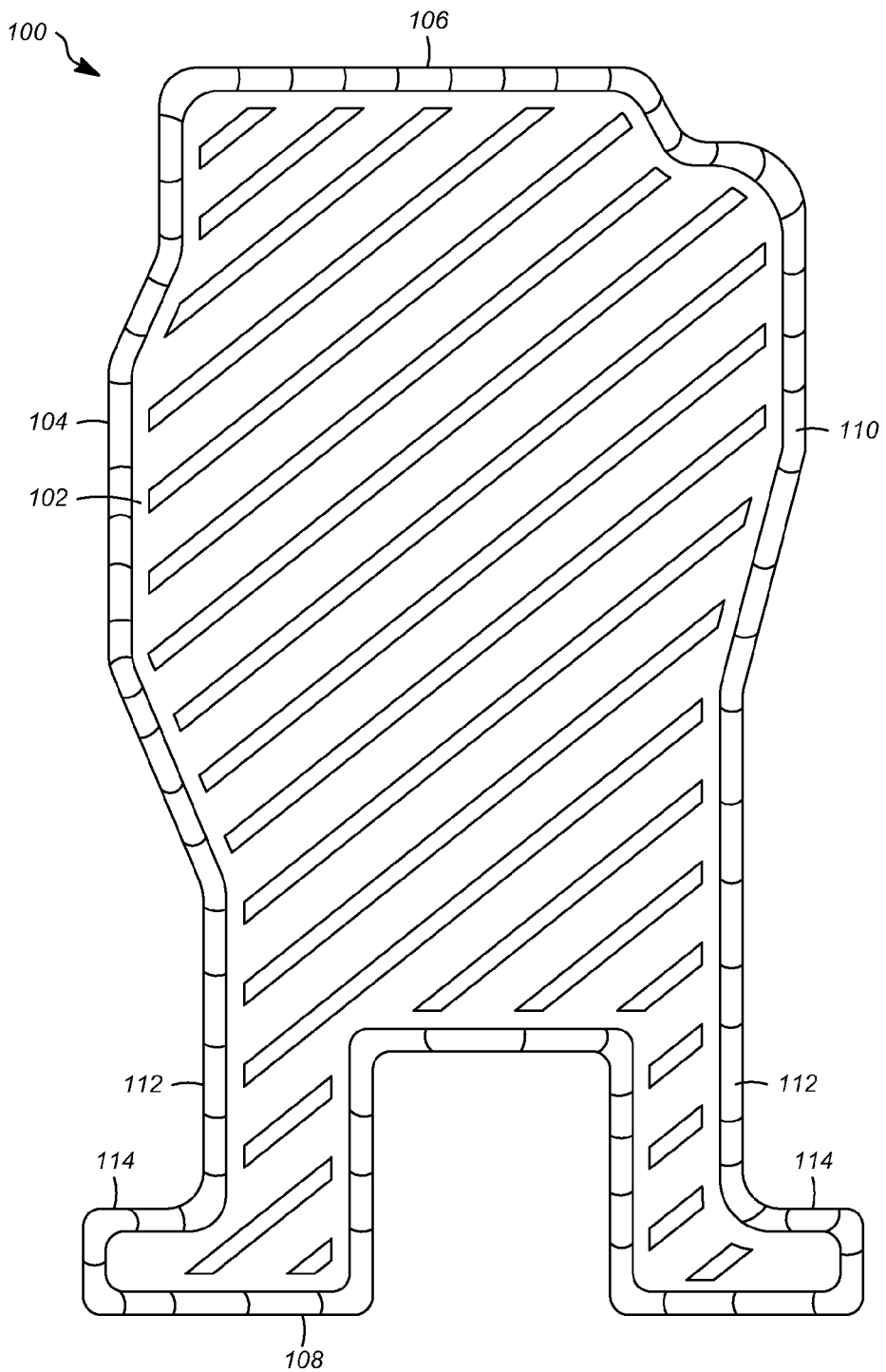
FIG. 2 is a top view of the floor mat of FIG. 1.

FIG. 2 shows an engagement structure of the floor mat 100 defined at a peripheral edge 110. The peripheral edge 110 can define an outer perimeter of the floor mat 100. The floor mat 100 can define a common perimeter that is defined between the substantially planar surfaces that are defined by the upper surface 102 and the lower surface 104. The peripheral edge 110 extends at least a majority of the distance between the first end 106 and the second end 108. In the illustrated embodiment, the peripheral edge 110 extends the entirety of the distance between the first end 106 and the second end 108.

The engagement structure of the floor mat 100 includes a first edge portion 112 and a second edge portion 114. The first edge portion 112 extends substantially in the longitudinal direction. The second edge portion 114 is adjacent to the first edge portion 112. In particular, the first edge portion 112 can meet with or intersect the second edge portion 114 at a geometric feature of the peripheral edge 110 such as a 90° turn that is formed along the peripheral edge 110. The second edge portion can extend in a substantially lateral direction. In particular, the second edge portion 114 can extend at an angle that is non-parallel with respect to the first edge portion 112. In some examples, the second edge portion can extend at an angle that is transverse to the first edge portion 112. In other examples, the second edge portion 114 can extend substantially perpendicular to the first edge portion 112. In some embodiments, the floor mat 100 may include multiple sets of first and second edge portions 112, 114.

Figure 3A:
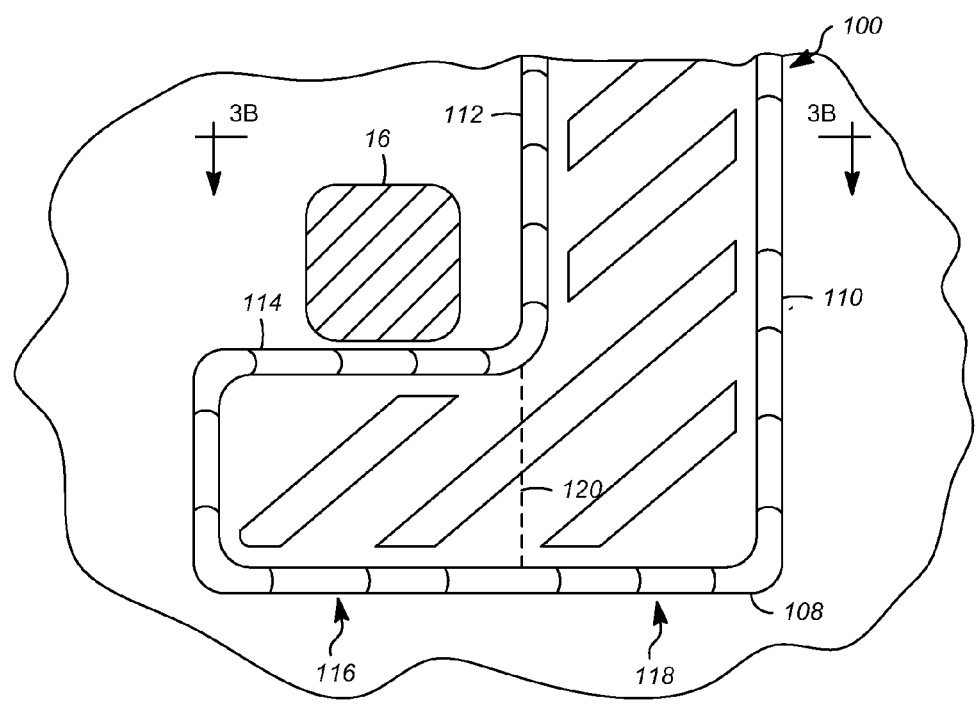
FIG. 3A is a top, detail view showing a secondary portion of the floor mat of FIG. 1 installed in the vehicle.

FIG. 3A shows a portion of the floor 12 of the vehicle 10, including the frame portion 16. The second edge portion 114 of the floor mat 100 is positioned rearward of the frame portion 16. The floor mat 100 is positioned such that the second edge portion 114 is directly adjacent to at least part of the frame portion 16. Thus, if a force is applied to the floor mat 100 that would urge the floor mat forward in the longitudinal direction, motion in this direction will be restrained by engagement of the second edge portion 114 with the frame portion 16. In other examples, the first edge portion 112 can also be configured to resist motion of the floor mat 100 by engagement with the frame portion 16. In such configurations, the first edge portion 112 can engage at least a portion of the frame portion 16 to restrain movement of the floor mat 100 with respect to the vehicle 10 in a substantially lateral direction.

The floor mat 100 can define a secondary portion 116 that is bendable with respect to a primary portion 118 of the floor mat 100 to allow installation and removal of the floor mat 100. The primary portion 118 is positionable at least partially forward of the seat 14 of the vehicle 10. The secondary portion 116 and the second edge portion 114 can be positionable underneath the seat 14 of the vehicle 10.

The secondary portion 116 can be disposed adjacent to the second edge portion 114. In some examples, the secondary portion 116 is disposed laterally outward from the first edge portion 112. In other examples, the secondary portion 116 is disposed longitudinally rearward from the second edge portion 114. The boundary between the secondary portion 116 and the primary portion 118 can be at a location indicated by bend line 120 in FIG. 3A, where the secondary portion 116 is bendable with respect to the primary portion 118. The bend line 120 is indicated for purposes of explanation only and does not necessarily correspond to a specific physical structure of the floor mat 100.

Figure 3B:
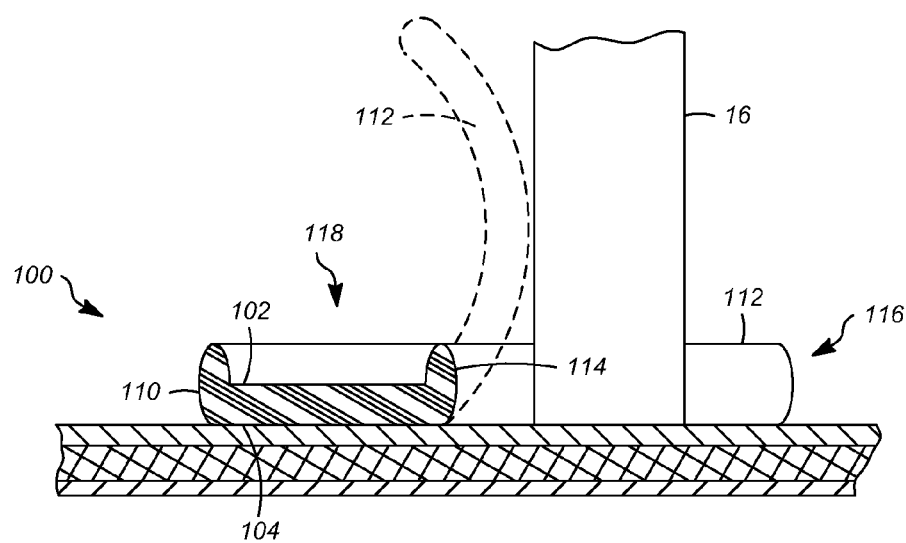
FIG. 3B is a front, detail view showing the secondary portion of the floor mat of FIG. 1 installed in the vehicle.

The secondary portion 116 is bendable with respect to the primary portion 118 to allow installation and removal of the floor mat 100. In particular, the secondary portion 116 can define a first position, wherein the secondary portion 116 is in contact with the floor 12. The secondary portion 116 is bendable to a second position, which is indicated in FIG. 3B by broken lines, wherein at least part of the secondary portion 116 is bent with respect to the primary portion 118 such that it is spaced from the floor 12. In this position, longitudinal movement of the floor mat 100 with respect to the floor 12 no longer causes engagement of the first edge portion 112 with respect to the frame portion 16 of the vehicle 10.

Figure 4:
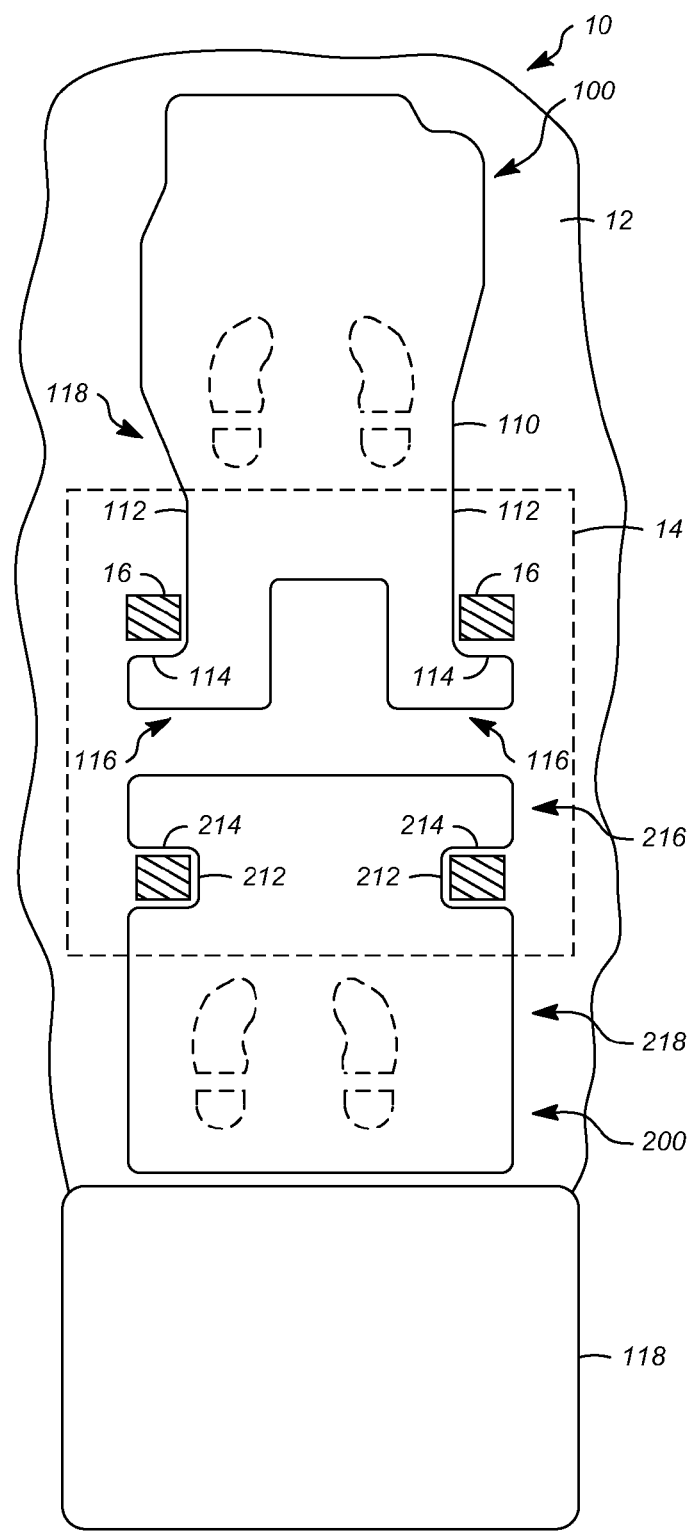
FIG. 4 is a top view showing a front floor mat and a rear floor mat installed in the vehicle according to a first alternative example.

In a first alternative example, as shown in FIG. 4, the floor mat 100 is utilized as a front floor mat, and is used in conjunction with a rear floor mat 200. In this example, the seat 14 of the vehicle 10 is utilized as a front seat, and the vehicle 10 further includes a rear seat 18. The rear floor mat 200 is positioned longitudinally forward of the rear seat 18.

In the first alternative example, at least a portion of the floor mat 100 is positioned underneath the seat 14 of the vehicle 10. In particular, the secondary portion 116 and the second edge portion 114 of the floor mat 100 can be positioned underneath the seat 14. At least part of the primary portion 118 of the floor mat 100 can be positioned forward with respect to the seat 14 of the vehicle 10.

The rear floor mat 200 is similar in structure to the floor mat 100. The rear floor mat 200 includes an engagement structure having a first edge portion 212 and a second edge portion 214, which are analogous to the first edge portion 112 and the second edge portion 114 of the floor mat 100. Engagement of the second edge portion 214 of the rear floor mat 200 with the frame portion 16 of the vehicle 10 can restrain movement of the rear floor mat 200 in the longitudinal direction with respect to the vehicle. A secondary portion 216 of the rear floor mat 200, which is analogous to the secondary portion 116 of the floor mat 100, is positioned underneath the seat 14 of the vehicle 10. The second edge portion 214 is also positioned underneath the seat 14 of the vehicle 10. A primary portion 218 of the rear floor mat 200 can be positioned at least partially rearward of the seat 14 of the vehicle 10.

Figure 5:
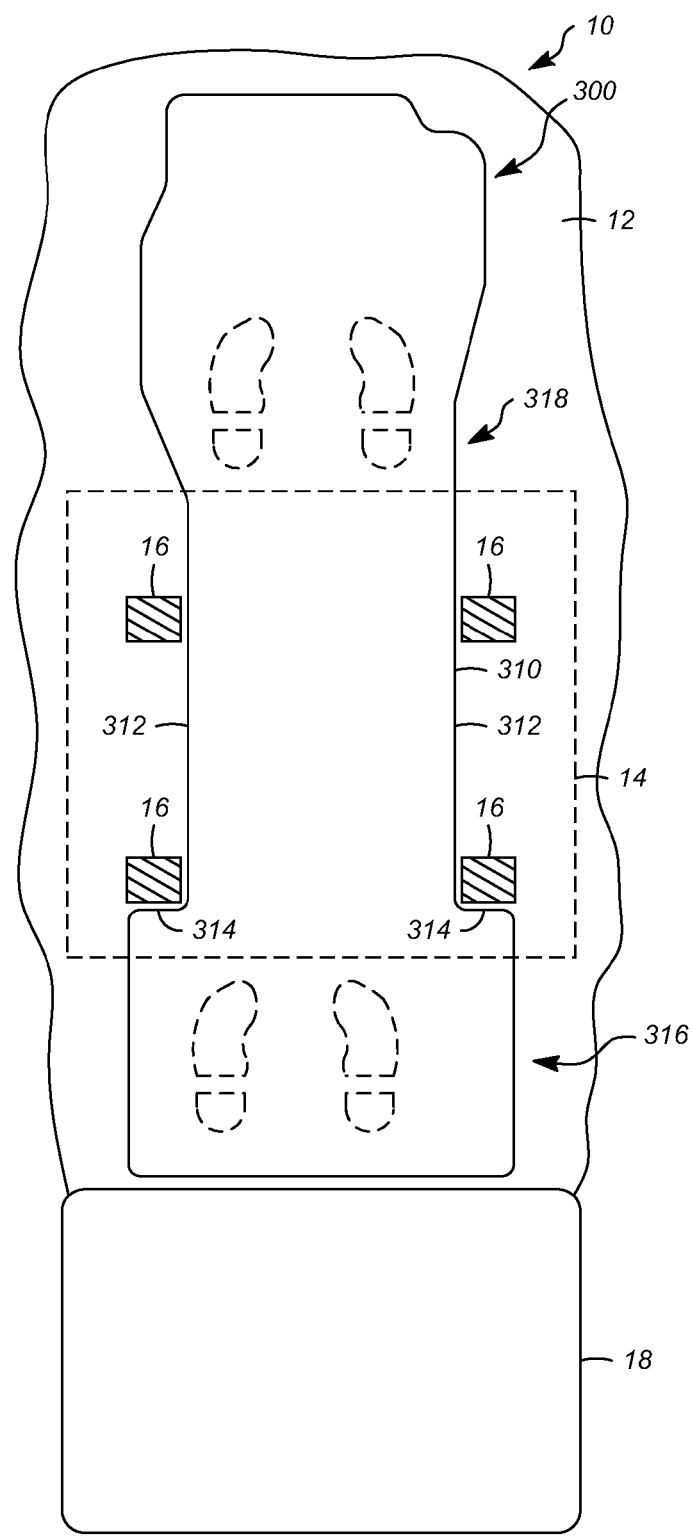
FIG. 5 is a top view showing a one piece front and rear floor mat installed in the vehicle according to a second alternative example.

In a second alternative example, as shown in FIG. 5, a one-piece front and rear floor mat 300 is installed within the vehicle 10. The floor mat 300 can include an engagement structure defined at a peripheral edge 310 having a first edge portion 312 and a second edge portion 314, which are analogous to the peripheral edge 110, first edge portion 112, and second edge portion 114 of the floor mat 100, respectively. The floor mat 300 further includes a secondary portion 316 and a primary portion 318, which are analogous to the secondary portion 116 and the primary portion 118 of the floor mat 100, respectively. The second edge portion 314 is engageable with the frame portion 16 of the seat 14 to restrain motion of the floor mat 300 with respect to the vehicle 10 in a lateral direction. The primary portion 318 of the floor mat 300 is disposed at least partially forward of the seat 14. At least part of the secondary portion 316 is disposed under the seat 14. At least part of the secondary portion 316 extends rearward of the seat 14. In particular, the secondary portion 316 can extend rearward toward the rear seat 18 and substantially occupy the area of the floor 12 of the vehicle 10 between the seat 14 and the rear seat 18 of the vehicle 10.

Figure 6:
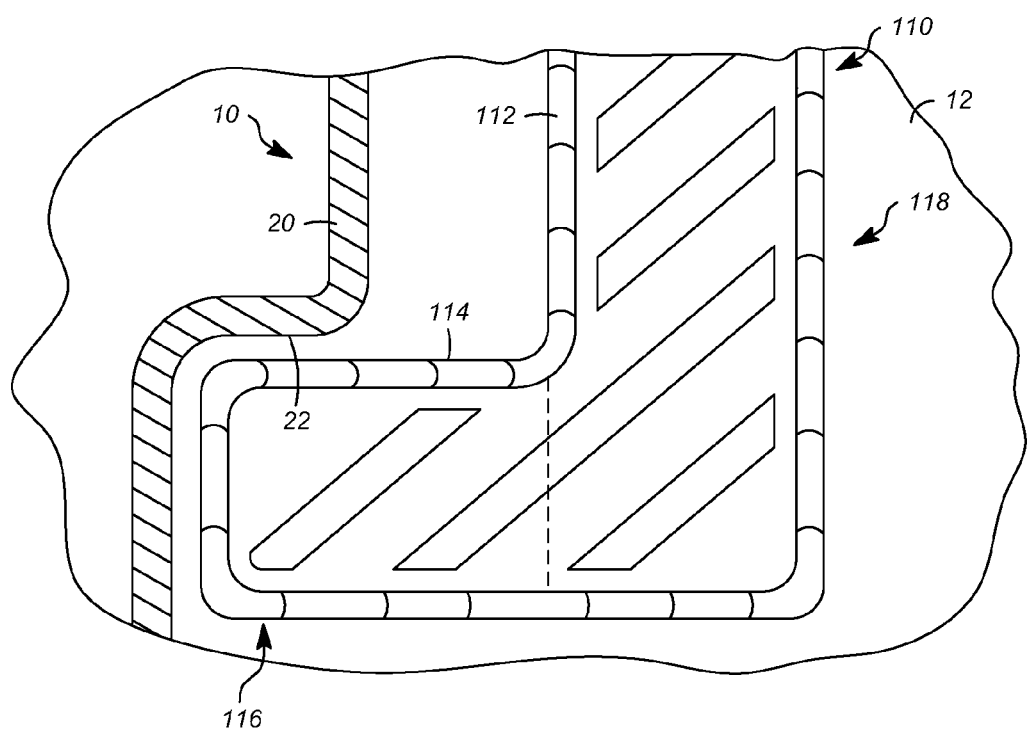
FIG. 6 is a top, detail view showing a secondary portion of a floor mat installed in a vehicle according to a third alternative example.

In a third alternative example, the at least one structural member of the vehicle need not be a frame portion 16 of the seat 14. For example, as shown in FIG. 6, the vehicle 10 can include a vehicle component 20 that extends upward with respect to the floor 12 of the vehicle 10 and is connected, at least indirectly, to the floor 12 of the vehicle 10. In one example, the vehicle component 20 is a body member of the vehicle 10. In another example, the vehicle component 20 is a trim panel of the vehicle 10.

The vehicle component 20 can include a surface 22 that extends in a substantially lateral direction (e.g., a cross-car direction). In particular, the surface 22 can extend substantially transverse to the longitudinal direction of the vehicle 10. The second edge portion 114 of the floor mat 100 is engageable with the surface 22 to restrain motion of the floor mat 100 with respect to the vehicle 10 in the longitudinal direction of the vehicle 10.

Figure 7:
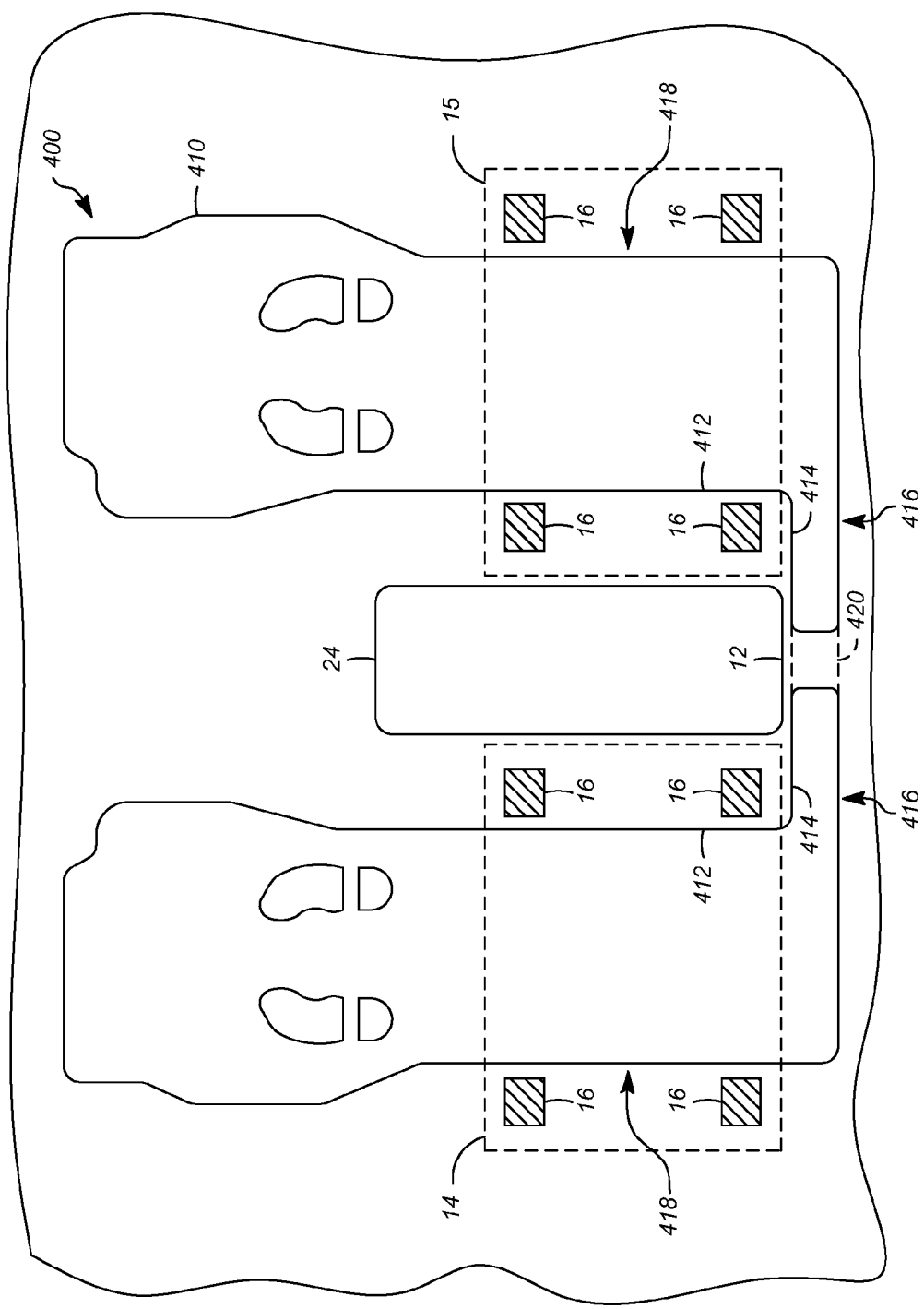
FIG. 7 is a top view showing a driver side floor mat and a passenger side floor mat installed in a vehicle having a center console according to a fourth alternative example.

In a fourth alternative example, as shown in FIG. 7, the seat 14 of the vehicle 10 is a driver side seat, and the vehicle 10 further includes a passenger side seat 15. A center console 24 (or storage compartment) is disposed between the seat 14 and the passenger side seat 15 of the vehicle. Thus, the center console 24 is laterally adjacent to both the seat 14 and the passenger side seat 15. The center console 24 can include a rear surface 26.

A respective floor mat 400 is provided for each of the seat 14 and the passenger side seat 15. The floor mats 400 are analogous to the floor mat 100 of FIG. 1. In particular, each of the floor mats 400 can include an engagement structure defined at a peripheral edge 410 having a first edge portion 412 and a second edge portion 414, which are analogous to respective ones of the peripheral edge 110, the first edge portion 112, and the second edge portion 114 of the floor mat 100. Each of the floor mats 400 can further include a secondary portion 416 and a primary portion 418, which are analogous to respective ones of the secondary portion 116 and the primary portion 118 of the floor mat 100.

In this example, the second edge portion 414 of each of the floor mats 400 is engageable with the rear surface 26 of the center console 24 to restrain the floor mats 400 against movement with respect to the vehicle 10 in the longitudinal direction.

As a further alternative, the two floor mats 400 depicted in FIG. 7 could be combined into a single driver and passenger side floor mat by interconnecting the floor mats 400 at the secondary portions 416 thereof, as indicated by the call-out 420.

The foregoing description relates to what is presently considered to be the most practical embodiment. It is to be understood, however, that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A floor mat positionable in front of a vehicle seat on a vehicle floor of a vehicle having at least one structural member that contacts the vehicle floor and is disposed rearward of a front edge of the vehicle seat, the floor mat comprising:

a main body having an upper surface, a lower surface, a first end, and a second end that is spaced from the first end in a longitudinal direction of the vehicle; and an engagement structure defined at a peripheral edge of the main body between the upper and lower surfaces, the engagement structure having a first edge portion that extends in the longitudinal direction and a second edge portion that extends from the first edge portion in a lateral direction of the vehicle that is substantially perpendicular to the longitudinal direction, wherein the second edge portion is positionable underneath the vehicle seat to engage the at least one structural member of the vehicle to restrain horizontal movement of the main body in the longitudinal direction of the vehicle.

2. The floor mat of claim 1, wherein the first edge portion extends a majority of the distance between the first end and the second end.

3. The floor mat of claim 1, wherein the main body includes a primary portion that is positionable at least partially forward of the vehicle seat and a secondary portion that is located rearward of the second edge portion.

4. The floor mat of claim 1, wherein the main body includes a primary portion that is positionable at least partially forward of the vehicle seat and a secondary portion that is positionable at least partially rearward of the vehicle seat.

5. The floor mat of claim 1, wherein at least part of the main body is bendable to allow installation and removal of the main body while the main body is horizontally situated.

6. A vehicle comprising:

a vehicle floor;

a vehicle seat connected to the vehicle floor;

at least one structural member that contacts the vehicle floor and is disposed rearward of a front edge of the vehicle seat; and a floor mat positionable on the vehicle floor and selectively removable from the vehicle floor while the vehicle seat remains connected to the vehicle floor, the floor mat having:

a main body with an upper surface, a lower surface, a first end, and a second end that is spaced from the first end in a longitudinal direction of the vehicle, wherein the floor mat is positionable on the vehicle floor such that a first portion of the main body of the floor mat is disposed in front of the vehicle seat and a second portion of the main body of the floor mat is disposed underneath the vehicle seat; and an engagement structure defined at a peripheral edge of the main body between the upper and lower surfaces, the engagement structure having a first edge portion that extends in the longitudinal direction and a second edge portion that extends from the first edge portion in a lateral direction of the vehicle that is substantially perpendicular to the longitudinal direction, wherein the second edge portion is positionable to engage the at least one structural member of the vehicle to restrain horizontal movement of the main body in the longitudinal direction of the vehicle.

7. The vehicle of claim 6, wherein the first edge portion extends a majority of the distance between the first end and the second end.

8. The vehicle of claim 6, wherein the second edge portion is disposed underneath the vehicle seat.

9. The vehicle of claim 6, wherein the main body includes a primary portion that is positionable at least partially forward of the vehicle seat and a secondary portion that is located rearward of the second edge portion.

10. The vehicle of claim 6, wherein main body includes a primary portion that is disposed at least partially forward of the vehicle seat and a secondary portion that is disposed at least partially rearward of the vehicle seat.

11. The vehicle of claim 6, wherein the at least one structural member is disposed underneath the vehicle seat.

12. The vehicle of claim 6, wherein the at least one structural member is a frame portion of the vehicle seat.

13. The vehicle of claim 6, wherein the at least one structural member is a vehicle body member.

14. The vehicle of claim 6, wherein the at least one structural member is a vehicle trim panel.

15. The vehicle of claim 6, wherein the at least one structural member is a storage compartment that is supported by the vehicle floor.

16. The vehicle of claim 6, wherein at least part of the main body is bendable to allow installation and removal of the main body while the main body is horizontally situated.

17. The vehicle of claim 6, further comprising:
an additional vehicle seat that is connected to the vehicle floor and is positioned adjacent to the vehicle seat, wherein a third portion of the main body of the floor mat is disposed underneath the additional vehicle seat and the floor mat is selectively removable from the vehicle floor while the additional vehicle seat remains connected to the vehicle floor.

18. A vehicle comprising:
a vehicle floor;
a vehicle seat;
at least one frame portion that is connected to the vehicle floor and the vehicle seat to support the vehicle seat with respect to the vehicle floor; and
a floor mat positionable on the vehicle floor in front of the vehicle seat having:
a main body with an upper surface, a lower surface, a first end, and a second end that is spaced from the first end in a longitudinal direction of the vehicle; and
an engagement structure defined at a peripheral edge of the main body between the upper and lower surfaces, the engagement structure having a first edge portion that extends in the longitudinal direction and a second edge portion that extends from the first edge portion in a lateral direction of the vehicle that is substantially perpendicular to the longitudinal direction, wherein the second edge portion is positionable to engage the at least one structural member of the vehicle to restrain horizontal movement of the main body in the longitudinal direction of the vehicle, wherein the first edge portion extends a majority of the distance between the first end and the second end and the second edge portion is disposed underneath the vehicle seat.

19. The vehicle of claim 18, wherein the main body includes a primary portion that is positionable at least partially forward of the vehicle seat and a secondary portion that is located rearward of the second edge portion.

20. The vehicle of claim 18, wherein main body includes a primary portion that is disposed at least partially forward of the vehicle seat and a secondary portion that is disposed at least partially rearward of the vehicle seat.

* * * * *